(12) United States Patent
Zhang et al.

(10) Patent No.: US 8,015,603 B2
(45) Date of Patent: Sep. 6, 2011

(54) METHOD AND MOBILE NODE FOR PACKET TRANSMISSION IN MOBILE INTERNET PROTOCOL NETWORK

(75) Inventors: Hongke Zhang, Shenzhen (CN); Sidong Zhang, Shenzhen (CN); Shen Yang, Shenzhen (CN); Wei Su, Shenzhen (CN); Yan Ren, Shenzhen (CN); Zuzhou Zheng, Shenzhen (CN); Yajuan Qin, Shenzhen (CN); Shuai Gao, Shenzhen (CN); Jianglin Wang, Shenzhen (CN); Ying Liu, Shenzhen (CN); Fuyou Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 999 days.

(21) Appl. No.: 11/855,696

(22) Filed: Sep. 14, 2007

(65) Prior Publication Data

US 2008/0069009 A1 Mar. 20, 2008

Related U.S. Application Data

(63) Continuation of application No. PCT/CN2006/000238, filed on Feb. 20, 2006.

(30) Foreign Application Priority Data

Mar. 15, 2005 (CN) .......................... 2005 1 0055313

(51) Int. Cl.
  *G06F 9/00* (2006.01)
  *G06F 15/16* (2006.01)
  *G06F 17/00* (2006.01)
  *G06F 15/173* (2006.01)
  *H04L 29/06* (2006.01)
(52) U.S. Cl. ............ 726/14; 726/13; 713/151; 713/154; 709/238; 709/230

(58) Field of Classification Search ............... 726/11, 726/13–14; 709/238; 713/153–154, 151
See application file for complete search history.

(56) References Cited

U.S. PATENT DOCUMENTS 5,983,350 A * 11/1999 Minear et al. .................. 726/11
(Continued)

FOREIGN PATENT DOCUMENTS

EP        1 424 828 A2     6/2004
(Continued)

OTHER PUBLICATIONS

Shen et al., "Firewall Traversal for Mobile IPv6 draft-miao-mip6-ft-00", Internet Engineering Task Force (IETF), Network Working Group, pp. 1:12 (Mar. 2005).*

(Continued)

*Primary Examiner* — Nathan Flynn
*Assistant Examiner* — Carolyn B Kosowski
(74) *Attorney, Agent, or Firm* — Leydig, Voit & Mayer, Ltd.

(57) ABSTRACT

A method for packet transmission in an MIP network is disclosed. A mobile node sends to a Home Agent (HA) a first Firewall Detection (FD) packet encapsulated with IP security (IPsec) protocol and a second FD packet encapsulated with the IPsec protocol and User Datagram Payload (UDP) protocol. The mobile node determines whether there is a firewall blocking an IPsec packet between the mobile node and the HA according to a Firewall Detection Reply (FDR) packet from the HA. If there is a firewall, packets are encapsulated with the UDP protocol and binding update and packet exchange are performed; otherwise, binding update and packet exchange are performed. A mobile node for packet transmission is also provided. Embodiments of the present invention enables the mobile node to exchange a packet with a correspondent node when there is a firewall not supporting the IPsec protocol between the mobile node and the HA.

10 Claims, 2 Drawing Sheets

U.S. PATENT DOCUMENTS

| | | | |
|---|---|---|---|
| 6,668,282 B1* | 12/2003 | Booth et al. | 709/224 |
| 6,795,917 B1* | 9/2004 | Ylonen | 713/160 |
| 6,865,184 B2* | 3/2005 | Thubert et al. | 370/401 |
| 6,957,346 B1* | 10/2005 | Kivinen et al. | 713/153 |
| 7,023,863 B1* | 4/2006 | Naudus et al. | 370/401 |
| 7,032,242 B1* | 4/2006 | Grabelsky et al. | 726/11 |
| 7,058,973 B1* | 6/2006 | Sultan | 726/12 |
| 7,079,520 B2* | 7/2006 | Feige et al. | 370/338 |
| 7,095,738 B1* | 8/2006 | Desanti | 370/389 |
| 7,143,188 B2* | 11/2006 | Maufer et al. | 709/245 |
| 7,181,612 B1* | 2/2007 | Pellacuru et al. | 713/153 |
| 7,213,263 B2* | 5/2007 | Makineni et al. | 726/11 |
| 7,242,689 B2* | 7/2007 | Ikemura et al. | 370/401 |
| 7,260,840 B2* | 8/2007 | Swander et al. | 726/13 |
| 7,283,542 B2* | 10/2007 | Mitchell | 370/401 |
| 7,305,481 B2* | 12/2007 | Blanchet et al. | 709/230 |
| 7,310,356 B2* | 12/2007 | Abdo et al. | 370/522 |
| 7,346,770 B2* | 3/2008 | Swander et al. | 713/153 |
| 7,424,737 B2* | 9/2008 | Wesinger et al. | 726/11 |
| 7,448,081 B2* | 11/2008 | Balissat et al. | 726/15 |
| 7,453,887 B2* | 11/2008 | Thubert et al. | 370/395.52 |
| 7,526,571 B1* | 4/2009 | Tappan et al. | 709/245 |
| 7,559,082 B2* | 7/2009 | Morgan et al. | 726/14 |
| 7,581,247 B2* | 8/2009 | Sultan | 726/12 |
| 7,647,492 B2* | 1/2010 | Asnis et al. | 713/151 |
| 2002/0083344 A1* | 6/2002 | Vairavan | 713/201 |
| 2002/0174335 A1 | 11/2002 | Zhang et al. | |
| 2003/0135616 A1* | 7/2003 | Carrico et al. | 709/225 |
| 2004/0148428 A1* | 7/2004 | Tsirtsis | 709/238 |
| 2004/0151135 A1 | 8/2004 | Kitahama et al. | |
| 2004/0246991 A1* | 12/2004 | Tsuzuki et al. | 370/466 |
| 2005/0076235 A1* | 4/2005 | Ormazabal et al. | 713/201 |
| 2005/0268332 A1* | 12/2005 | Le et al. | 726/11 |
| 2006/0070122 A1* | 3/2006 | Bellovin | 726/14 |
| 2006/0168321 A1* | 7/2006 | Eisenberg et al. | 709/238 |
| 2006/0294584 A1* | 12/2006 | Sundaram | 726/11 |
| 2007/0050613 A1* | 3/2007 | Islam et al. | 713/150 |
| 2007/0074280 A1* | 3/2007 | Callaghan | 726/12 |
| 2008/0192758 A1* | 8/2008 | Mahkonen | 370/401 |
| 2009/0016246 A1* | 1/2009 | Battin et al. | 370/310 |
| 2009/0165091 A1* | 6/2009 | Liang | 726/3 |
| 2010/0071055 A1* | 3/2010 | Kaniz et al. | 726/14 |

FOREIGN PATENT DOCUMENTS

| | | |
|---|---|---|
| GB | 2 317 792 A | 4/1998 |

OTHER PUBLICATIONS

Thiruvengadam et al., "Mobile IPv6—NSIS Interaction for Firewall traversal draft-thiruvengadam-nsis-mip6-fw-01", Internet Engineering Task Force (IETF) NSIS, pp. 1:25, (Oct. 23, 2004).*

Extended European Search Report in corresponding European Application No. 06705659.8 (Jun. 11, 2008).

Written Opinion of the International Searching Authority in corresponding PCT Application No. PCT/CN2006/000238 (Jun. 8, 2006).

Johnson et al., "RFC 3775—Mobility Support in IPv6," Jun. 2004, The Internet Society, Reston, Virginia.

Kaufman, "Internet Key Exchange (IKEv2) Protocol," May 29, 2004, The Internet Society, Reston, Virginia.

Le et al., "draft-ietf-mip6-firewalls-00.txt," Feb. 2005, The Internet Society, Reston, Virginia.

* cited by examiner

METHOD AND MOBILE NODE FOR PACKET TRANSMISSION IN MOBILE INTERNET PROTOCOL NETWORK

This application is a continuation of International Patent Application No. PCT/CN2006/000238, filed Feb. 20, 2006, which claims priority to Chinese Patent Application No. 200510055313.8, filed Mar. 15, 2005, both of which are hereby incorporated by reference.

FIELD OF THE INVENTION

The present invention generally relates to Mobile Internet Protocol (MIP) technology, and particularly to a method and mobile node for packet transmission in an MIP network.

BACKGROUND OF THE INVENTION

Along with ever-development of hardware technology, mobile terminals such as laptops, Personal Digital Assistants (PDAs) generally called Palm-PC and mobile phones are used more and more widely. Furthermore, as the Internet develops rapidly, the network needs to provide not only existing data services and multimedia audio-video services for users, but also wireless Internet access services for users of mobile terminal apparatuses. In order to provide mobility for mobile nodes in IP networks, MIP version 6 (MIPv6) is developed.

As shown in FIG. 1, an MIPv6 network mainly includes network entities including mobile nodes, a correspondent node and a Home Agent (HA). A mobile node is a mobile terminal apparatus. The correspondent node is a node communicating with a mobile node and may be either a stationary node or a mobile node. The HA is a router on a home link of the mobile node, and the HA intercepts packets destined to the mobile node from the home link and forwards the intercepted packets to the mobile node. In the MIPv6 network, each mobile node has a permanent IP address called a home address, and the home address remains unchanged when the mobile node changes from one link to another. The mobile node further has a care-of address while away from home, i.e. a temporary address to identify the location of the mobile node. The care-of address changes when the mobile node changes from one link to another.

In order to achieve the inter-communication between a mobile node and its correspondent node, the current care-of address of a mobile node has to be bound with the home address, and the binding relation should be rebuilt when the care-of address changes. The binding between the home address and the care-of address is built through a process of binding update specified in a related protocol. As shown in FIG. 2, the conventional process of binding update is described below.

201: the mobile node sends a Binding Update (BU) packet to the HA of the mobile node to bind the home address with the current care-of address of the mobile node.

The BU packet contains the following cells:

1) Sequence Number (seq#), used by the HA for identifying the sequence of the BU packet, and used by the mobile node for matching the BU packet with a Binding update Acknowledgement (BA) packet received;

2) Lifetime, indicating the valid period of the BU, i.e. the difference between the current time and the time when the BU expires; where value 0 of the lifetime indicates that the HA would delete the binding corresponding to the BU;

3) Alternate Care-of Address Option, indicating the care-of address to be updated. Generally, the care-of address to be updated is the source address of the BU packet. However, because the source address, unprotected by IP security (IPsec) protocol, is vulnerable to attacks and spoof, the care-of address is contained in the BU packet in the Alternate Care-of Address Option so that the care-off address can be protected by the IPsec protocol.

202: the HA sends the BA packet to the mobile node to indicate the processing status of the BU.

The BA packet contains the following cells.

1) Status, indicating the processing of the BU corresponding to the BA by the HA, e.g. the Status 0 indicates that the HA has accepted the binding update requested by the BU corresponding to the BA;

2) Sequence Number (seq#), for identifying the BU and corresponding BA;

3) Lifetime, used by the HA for informing the mobile node of the time left before the binding expires;

4) Binding update Advice option, used by the HA for informing the mobile node of the time for resending the BU packet to update the binding, the value of the time being generally smaller than the value of Lifetime.

Through the process above, the mobile node interacts with the HA to complete the binding update between the home address and the current care-of address of the mobile node. In addition, when the HA accepts the binding update requested by the mobile node, the HA also records the corresponding relation between the home address and the current care-of address of the mobile node.

After the binding update is completed, the mobile node exchanges packets with the correspondent node in the mode of bi-directional tunnel or route optimization. The bi-directional tunnel is a packet tunnel built via the HA between the mobile node and the correspondent node. When the correspondent node does not support the MIPv6 and the mobile node roams to a visited network, the mode of bi-directional tunnel can ensure that the mobile node can always be accessed. The route optimization is the process of exchanging packets directly between the correspondent node supporting the MIPv6 and the mobile node. The mode of route optimization avoids the transmission delay relevant to the bi-directional tunnel, and provides satisfactory performance for delay-sensitive traffic service, such as Voice over IP service (VoIP), etc.

As shown in FIG. 1, the process of exchanging packets between the mobile node and the correspondent node in the mode of bi-directional tunnel and route optimization is described below.

In the mode of bi-directional tunnel, the address of a packet exchanged between the mobile node and the HA is indicated by an internal IP header and an external IP header. Both internal IP header and external IP header contain source addresses and destination addresses. When the mobile node sends a packet to the correspondent node, in the packet from the mobile node to the HA, the source address of the external IP header is the current care-of address of the mobile node and the destination address of the external IP header is the address of the HA, while the source address of the internal IP header is the home address of the mobile node and the destination address of the internal IP header is the address of the correspondent node. The packet sent by the mobile node is routed to the HA based on the external IP header of the packet, and the HA removes the external IP header and sends the packet without the external IP header to the correspondent node according to the destination address in the internal IP header. Thus the packet transmission from the mobile node to the correspondent node is completed. When the correspondent node sends a packet to the mobile node, the packet sent by the correspondent node contains only one IP header, and the source address in the IP header is the address of the correspondent node and the destination address is the home address of the mobile node. When the HA intercepts the packet, the HA encapsulates a second IP header outside the previous IP header, and the source address in the second IP header is the address of the HA and the destination address is the current care-of address of the mobile node. The packet encapsulated by the HA is routed to the mobile node. Thus the packet transmission from the correspondent node to the mobile node is completed. By far, the packet exchange between the mobile node and the correspondent node in the mode of bi-directional tunnel is accomplished.

In the mode of route optimization, the mobile node needs to register, at the correspondent node, the binding relation between the home address and the current care-of address of the mobile node before the packet exchange. In a packet from the correspondent node to the mobile node, the address of the correspondent node is set as the source address and the current care-of address of the mobile node is set as the destination address. In a packet from the mobile node to the correspondent node, the current care-of address of the mobile node is set as the source address and the address of the correspondent node is set as the destination address. When the correspondent node sends a packet to the mobile node, the correspondent node first searches for the current care-of address of the mobile node in the binding relation stored at the correspondent node, and sends the packet to the current care-of address of the mobile node so that the packet may reach the mobile node. When the mobile node sends a packet to the correspondent node, the packet from the mobile node is sent directly to the correspondent node. In this way, the packet exchange between the mobile node and the correspondent node in the mode of route optimization is accomplished.

Currently, more and more attention is paid to security, and a firewall is widely applied to various parts of a network. The firewall is a set of components installed between different networks for network access management. In a network with firewalls, all the incoming and outgoing network data traffic between the network protected by the firewalls and a network outside the firewalls must pass through the firewalls, and only the data traffic in compliance with security policies of the firewalls could pass through the firewalls. The firewalls are strong against attacks themselves.

A firewall in working mode determines the connection type of a packet according to the port number indicated in the Transfer Control Protocol (TCP)/User Datagram Protocol (UDP) field of the packet. If the connection is secure and permitted, the firewall allows the packet to pass through; otherwise, the firewall drops the packet directly.

In the MIPv6 network shown in FIG. 1, if there is a firewall between the mobile node and the HA, all packets between the mobile node and the HA have to be filtered by the firewall, and only the packets permitted by the firewall can reach the destination, while the packets not permitted by the firewall will be dropped directly by the firewall. As shown in Table 1, a packet encapsulated by using the IPsec protocol between the mobile node and the HA contains an IP address field, an Encapsulation Security Payload (ESP) field, a TCP/UDP field and a Data field, and so on. The ESP field, the TCP/UDP field and the Data field are encapsulated with the IPsec protocol. When a firewall not supporting the IPsec protocol receives a packet in the above format, the firewall is unable to retrieve the TCP/UDP port number from the packet and can not determine whether the packet is secure, thus the firewall will not permit the packet encapsulated with the IPsec protocol to pass through. Therefore the firewall not supporting the IPsec protocol may block normal communications between the mobile node and the HA.

TABLE 1

| IP | ESP | TCP/UDP | Data |
|---|---|---|---|

As can be seen from the above, in the conventional packet transmission in MIPv6 networks, when a firewall not supporting the IPsec protocol exists between the HA and the mobile node, the BU packet from the mobile node to the HA is dropped directly, and the HA can not update the binding relation between the home address and the care-of address because the HA receives no BU packet. When the binding update fails, the mobile node can not exchange packets with the correspondent node whether in the mode of the bi-directional tunnel or the mode of route optimization. In addition, the route for the packet in the mode of bi-directional tunnel is "mobile node—HA—correspondent node" or "correspondent node—HA—mobile node", and the packets can not be exchanged normally because a firewall not supporting the IPsec protocol exists between the HA and the mobile node.

SUMMARY OF THE INVENTION

Embodiments of the present invention provide a method for packet transmission in a Mobile Internet Protocol (MIP) network, which enables a mobile node to exchange a packet with a correspondent node even when a firewall not supporting IPsec protocol is configured between the mobile node and a Home Agent (HA).

An embodiment of the present invention provides a method for packet transmission in a Mobile Internet Protocol (MIP) networks. The method for packet transmission includes:

sending, by a mobile node to a Home Agent (HA), a first Firewall Detection (FD) packet encapsulated with IP security (IPsec) protocol and a second FD packet encapsulated with IPsec protocol and User Datagram Payload (UDP) protocol;

determining whether there is a firewall blocking an IPsec packet between the mobile node and the HA according to a Firewall Detection Reply (FDR) packet from the HA;

encapsulating packets with the UDP protocol and performing binding update and packet exchange if there is a firewall blocking an IPsec packet; and performing binding update and packet exchange if there is no firewall blocking an IPsec packet.

An embodiment of the present invention provides a mobile node for packet transmission, including:

a first module for sending a first Firewall Detection (FD) packet encapsulated with IP security (IPsec) protocol and a second FD packet encapsulated with IPsec protocol and User Datagram Payload (UDP) protocol to a Home Agent (HA);

a second module for determining whether there is a firewall blocking an IPsec packet according to a Firewall Detection Reply (FDR) packet received from the HA;

a third module for encapsulating packets with the UDP protocol and performing binding update and packet exchange when the second module determines that there is a firewall blocking an IPsec packet; and a fourth module for performing binding update and packet exchange when the second module determines that there is no firewall blocking an IPsec packet.

The embodiments of present invention enables the mobile node to exchange packets with the correspondent node when there is a firewall not supporting the IPsec protocol between the mobile node and the HA. Specifically, the present invention has the following merits.

First, in the embodiments of the present invention, before the binding update and the packet exchange, the mobile node sends a first FD packet encapsulated with the UDP protocol and a second FD packet not encapsulated with the UDP protocol to the HA, and determines whether there is a firewall blocking IPsec packets (i.e. the packets encapsulated with the IPsec protocol) between the mobile node and the HA according to an FDR packet received. If there is the firewall blocking the IPsec packets, all the subsequent packets are encapsulated with the UDP protocol to avoid interruption of the packet transmission in the MIP network because of the firewall.

Second, in the embodiments of the present invention, the packets are encapsulated with the UDP protocol only when there is a firewall blocking the IPsec packets between the mobile node and the HA, but not all packets are encapsulated with the UDP protocol, in other word, dynamic UDP encapsulation is implemented. Thus the load of the network becomes lighter and the network resource consumption is reduced.

DETAILED DESCRIPTION OF THE INVENTION

The embodiments of the present invention are hereinafter further described in detail with reference to the accompanying drawings so as to make the technical scheme and merits thereof more apparent.

Embodiments of the present invention provide a method for packet transmission in an MIP network. According to an embodiment of the present invention, a mobile node sends two FD packets to the HA of the mobile node before the binding update. One of the two FD packets is encapsulated with the IPsec protocol and the other is encapsulated with the IPsec protocol and the UDP protocol. The mobile node determines whether there is a firewall blocking an IPsec packet between the mobile node and the HA according to an FDR packet received. If there is a firewall blocking an IPsec packet, all the subsequent packets are encapsulated with the UDP protocol, and the follow-up binding update and packet exchange are performed. Otherwise, the follow-up binding update and packet exchange are performed according to the prior alt.

The format of the IPsec packet encapsulated with the UDP protocol in accordance with an embodiment of the present invention is shown in Table 2.

TABLE 2

| IP | UDP | ESP | TCP/UDP | Data |
|----|-----|-----|---------|------|

In the format of the IPsec packet, the UDP field stores the information in the TCP/UDP field before encrypted. It can be seen that a firewall not supporting the IPsec protocol can retrieve the TCP/UDP port number of a packet from the UDP field when receiving the packet encapsulated with the UDP protocol, and the firewall not supporting the IPsec protocol can determine whether the packet is secure. Therefore, a packet encapsulated with the UDP protocol will not be blocked, because of the encryption in the TCP/UDP field, by the firewall not supporting the IPsec protocol.

Based on the above, in the embodiment of the present invention, an FD packet encapsulated with the UDP protocol and an FD packet not encapsulated with the UDP protocol are utilized to detect a firewall before packet transmission in the MIP network.

Figure 1:
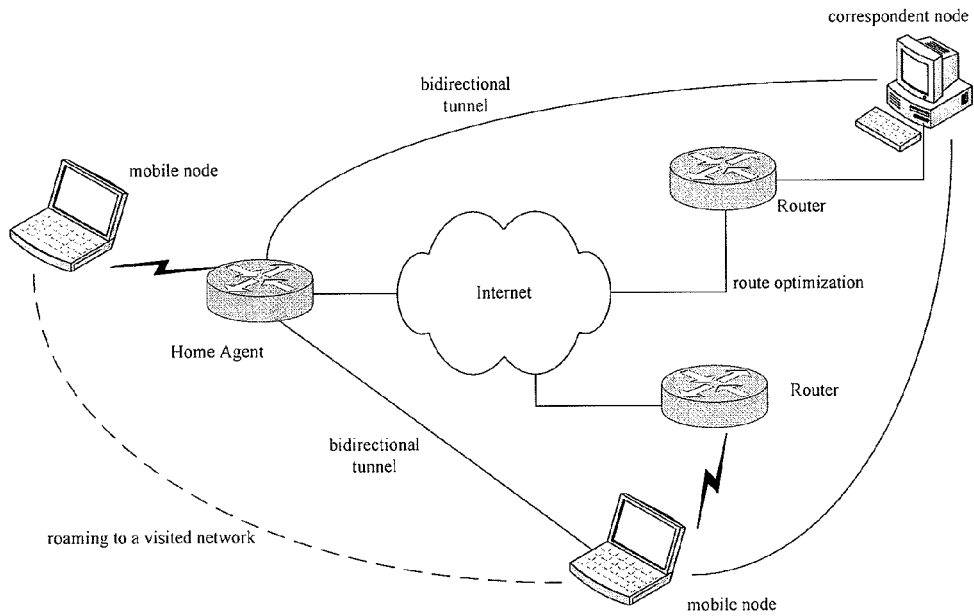
FIG. 1 is a schematic diagram illustrating the structure of an MIP network.
Figure 2:
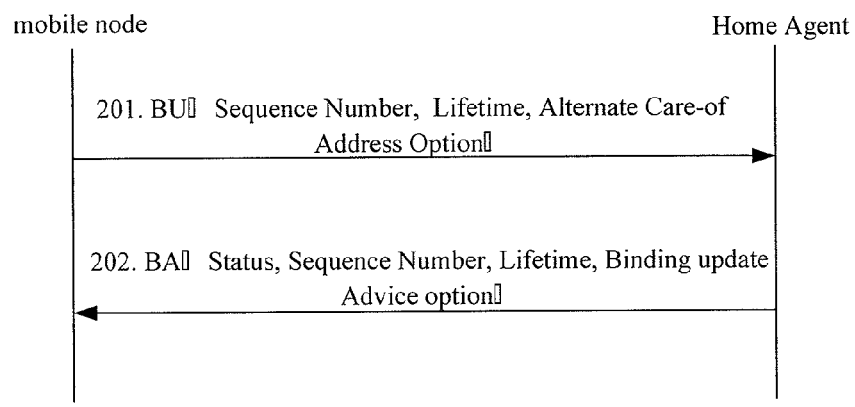
FIG. 2 is a flowchart of conventional binding update signaling during packet transmission in an MIP network.
Figure 3:
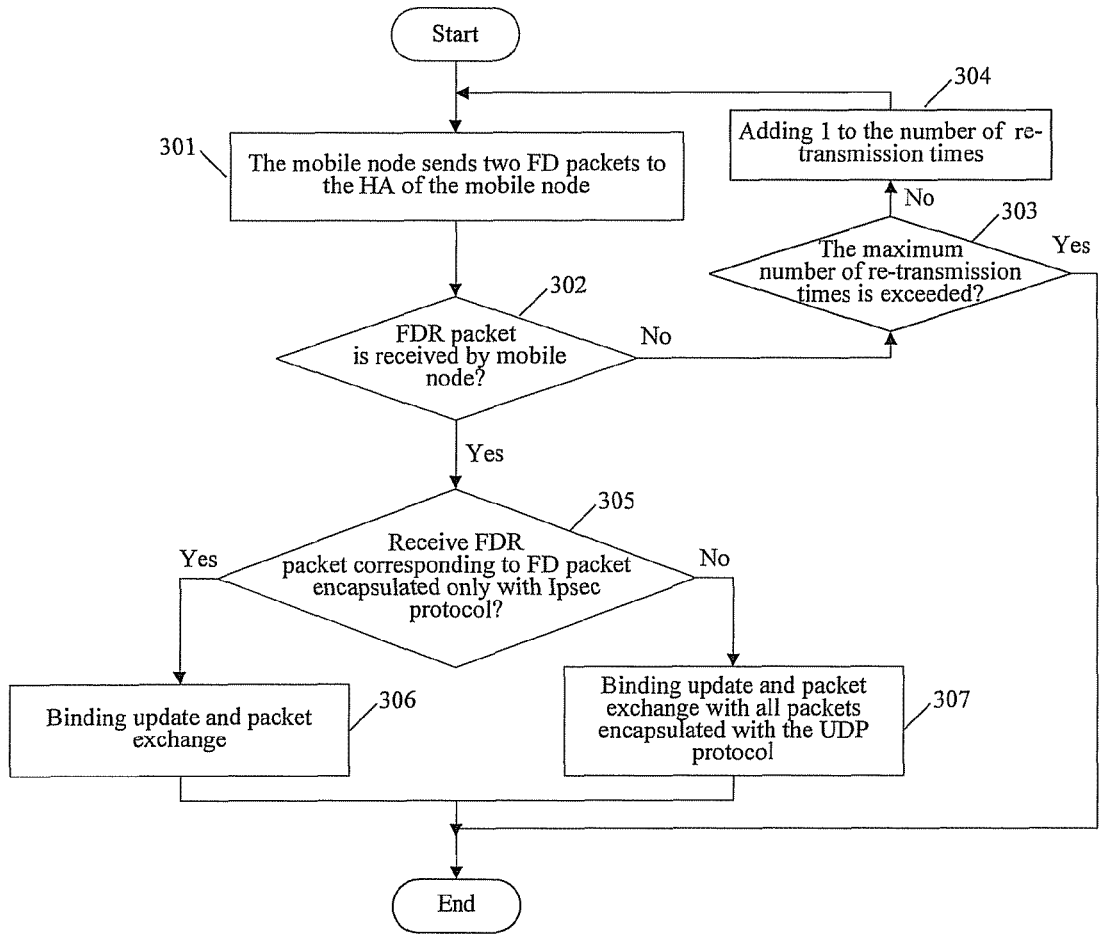
FIG. 3 is a flowchart of packet transmission in an MIP network in accordance with an embodiment of the present invention.

As shown in FIG. 3, the method for packet transmission in the MIP network in accordance with an embodiment of the present invention is described below.

Block 301: a mobile node sends to the HA of the mobile node a first FD packet and a second FD packet. The first FD packet is encapsulated with the IPsec protocol only, and the second FD packet is encapsulated with both IPsec protocol and UDP protocol.

In this Block, when there is a firewall not supporting the IPsec protocol between the mobile node and the HA, the second FD packet encapsulated with the UDP protocol will be able to pass through the firewall and reach the HA, while the first FD packet not encapsulated with the UDP protocol will be dropped. And in this Block, the first FD packet contains a cookie to identify the corresponding relation between the first FD packet and an FDR packet received; similarly, the second FD packet also contains a cookie to identify the corresponding relation between the second FD packet and an FDR packet received. An FD packet and an FDR packet correspond to each other only when the FD packet and the FDR packet have the same cookie. Furthermore, in this Block, the encapsulation of the second FD packet with the UDP protocol includes: inserting a UDP field into an FD packet which is not encapsulated with the UDP protocol, where the UDP field contains the UDP port number of the FD packet so that the firewall blocking the IPsec packet may recognize the FD packet and permit the FD packet to pass through.

Blocks 302 to 304: the mobile node determines whether an FDR packet is received. If an FDR packet is received, Block 305 is performed; otherwise, the mobile node determines whether the maximum number of re-transmission times is exceeded. If the maximum number of re-transmission times is exceeded, the process of packet transmission is terminated; otherwise, the number of re-transmission times is added by 1 and Block 301 is performed again.

Each time the HA receives an FD packet, the HA sends an FDR packet to the mobile node. In detail, when the HA receives a second FD packet encapsulated with the UDP protocol, the HA sends a second FDR packet also encapsulated with the UDP protocol; when the HA receives a first FD packet not encapsulated with the UDP protocol, the HA sends a first FDR packet not encapsulated with the UDP protocol. In addition, the cookie in the FDR packet is identical with the cookie in the corresponding FD packet. When the network functions normally, the mobile node can always receive the FDR packet. However, when the network functions badly and both FD packets sent in Block 301 are lost, the HA would not send any FDR packet to the mobile node.

When receiving no FDR packet, the mobile node re-transmits an FD packet in order to detect a firewall effectively. To avoid re-transmitting an FD packet with an infinite number of times, the network manager may set in advance a maximum number of re-transmission times. The FD packet will be re-transmitted only when the number of times for FD packet re-transmission is smaller than the maximum number of re-transmission times, that is, the Block 301 will be performed again with the number of times for FD packet re-transmission being added by 1.

Blocks 305 to 307: the mobile node determines whether the mobile node receives the FDR packet corresponding to the first FD packet encapsulated only with the IPsec protocol. If the mobile node receives the FDR packet corresponding to the first FD packet, the follow-up binding update and packet exchange are performed. Otherwise, all the subsequent packets are encapsulated with the UDP protocol, and the follow-up binding update and packet exchange are performed.

The process of the mobile node determining whether the mobile node receives the FDR packet corresponding to the first FD packet encapsulated only with the IPsec protocol is described below. The mobile node parses the FDR packet received and extracts the cookie in the FDR packet. The mobile node determines whether the cookie in the FDR packet is identical with the cookie in the first FD packet which is not encapsulated with the UDP protocol. If the cookie in the FDR packet is identical with the cookie in the first FD packet, it is determined that the mobile node receives the first FDR packet corresponding to the first FD packet encapsulated only with the IPsec protocol, indicating that there is no firewall or that the firewall between the mobile node and the HA supports the IPsec protocol. If the cookie in the FDR packet is not identical with the cookie in the first FD packet, it is determined that the mobile terminal receives no first FDR packet corresponding to the first FD packet encapsulated only with the IPsec protocol, indicating that there is a firewall not supporting the IPsec protocol between the mobile node and the HA.

When there is the firewall not supporting the IPsec protocol, the follow-up binding update and packet exchange in the MIP network are performed. The binding update and the packet exchange in this case according to this embodiment of the present invention differs from that in the prior art in that: all IPsec packets are encapsulated with the UDP protocol in order to guarantee that the IPsec packets can pass through the firewall, in other words, a UDP field storing the information before being encrypted in the TCP/UDP field of a packet is inserted into the packet. When there is no firewall or when the firewall supports the IPsec protocol, the binding update and the packet exchange are performed as in the prior art because the IPsec packets can successfully reach the destination.

Thus, the packet transmission in the MIP network in accordance with this embodiment of the present invention is accomplished.

The foregoing are only preferred embodiments of the present invention and are not for use in limiting the protection scope thereof. All modifications, equivalent replacements or improvements in accordance with the spirit and principles of the present invention shall be included in the protection scope of the present invention.

What is claimed is:

1. A method for packet transmission in a Mobile Internet Protocol (MIP) network, comprising:
    sending, by a mobile terminal apparatus to a Home Agent (HA), a first Firewall Detection (FD) packet encapsulated with IP security (IPsec) protocol and a second FD packet encapsulated with IPsec protocol and User Datagram Payload (UDP) protocol;
    determining whether there is a firewall blocking an IPsec packet between the mobile terminal apparatus and the HA by way of determining whether a Firewall Detection Reply (FDR) packet received from the HA corresponds to the first FD packet encapsulated with the IPsec protocol or the second FD packet encapsulated with the IPsec protocol and the UDP protocol, wherein said determining whether there is a firewall blocking the IPsec packet comprises: determining that there is no firewall blocking the IPsec packet when the FDR packet received corresponds to the first FD packet; and determining that there is the firewall blocking the IPsec packet when the FDR packet received corresponds to the second FD packet;
    encapsulating packets with the UDP protocol and performing binding update and packet exchange if there is the firewall blocking the IPsec packet; and
    performing binding update and packet exchange if there is no firewall blocking the IPsec packet.

2. The method of claim 1, wherein the FDR packet sent to the mobile terminal apparatus contains a cookie which is identical with a cookie contained in the first FD packet or in the second FD packet.

3. The method of claim 2, further comprising:
    parsing the FDR packet and extracting the cookie contained in the FDR packet; wherein
    the FDR packet corresponds to the first FD packet when the cookie contained in the FDR packet is identical with the cookie contained in the first FD packet; and
    the FDR packet corresponds to the second FD packet when the cookie contained in the FDR packet is identical with the cookie contained in the second FD packet.

4. The method of claim 1, further comprising:
    when receiving no FDR packet, terminating the packet transmission when the number of re-transmission times for the first FD packet and the second FD packet exceeds a maximum number of re-transmission times; and
    adding 1 to the number of re-transmission times and sending the first FD packet and the second FD packet once more when the number of re-transmission times does not exceed the maximum number of re-transmission times.

5. The method of claim 1, wherein the second FD packet comprises: a UDP field for containing a UDP port number of the second FD packet;
    the FDR packet corresponding to the second FD packet comprises: a UDP field for containing a UDP port number of the FDR packet corresponding to the second FD packet.

6. The method of claim 5, wherein said encapsulating packets with the UDP protocol comprises:
    storing information into the UDP field, and adding the UDP field into the second FD packet, wherein the information is in a Transfer Control Protocol (TCP)/User Datagram Payload (UDP) protocol field in the second FD packet and is not encrypted.

7. A mobile terminal apparatus for packet transmission, comprising:
    a first module configured to send a first Firewall Detection (FD) packet encapsulated with IP security (IPsec) protocol and a second FD packet encapsulated with IPsec protocol and User Datagram Payload (UDP) protocol to a Home Agent (HA);
    a second module configured to determine whether there is a firewall blocking an IPsec packet by way of determining whether a Firewall Detection Reply (FDR) packet received from the HA corresponds to the first FD packet encapsulated with the IPsec protocol or the second FD packet encapsulated with the IPsec protocol and the UDP protocol,
    wherein the second module comprises: a sub-module configured to determine that there is no firewall blocking the IPsec packet when determining that the FDR packet received corresponds to the first FD packet; and a sub-module configured to determine that there is the firewall blocking the IPsec packet when determining that the FDR packet received corresponds to the second FD packet;

a third module configured to encapsulate packets with the UDP protocol and perform binding update and packet exchange when the second module determines that there is the firewall blocking the IPsec packet; and a fourth module configured to perform binding update and packet exchange when the second module determines that there is no firewall blocking the IPsec packet.

8. The mobile terminal apparatus of claim 7, further comprising:

a fifth module configured to determine whether the number of re-transmission times for the first FD packet and the second FD packet exceeds a maximum number of re-transmission times;

a sixth module configured to terminate the packet transmission when the fifth module determines that the number of re-transmission times exceeds the maximum number of re-transmission times; and a seventh module configured to add 1 to the number of re-transmission times and notify the first module to send the first FD packet and the second FD packet once more when the fifth module determines that the number of re-transmission times does not exceed the maximum number of re-transmission times.

9. A Mobile Internet Protocol (MIP) system, the system comprising at least one mobile terminal apparatus configured to:

send a first Firewall Detection (FD) packet encapsulated with IP security (IPsec) protocol and a second FD packet encapsulated with IPsec protocol and User Datagram Payload (UDP) protocol to a Home Agent (HA);

determine whether there is a firewall blocking an IPsec packet by way of determining whether a Firewall Detection Reply (FDR) packet received from the HA corresponds to the first FD packet encapsulated with the IPsec protocol or the second FD packet encapsulated with the IPsec protocol and the UDP protocol; and determining that there is no firewall blocking the IPsec packet when the FDR packet received corresponds to the first FD packet; and determining that there is the firewall blocking the IPsec packet when the FDR packet received corresponds to the second FD packet;

encapsulate packets with the UDP protocol and performing binding update and packet exchange when there is the firewall blocking the IPsec packet; and perform binding update and packet exchange when there is no firewall blocking the IPsec packet.

10. The MIP system of claim 9, wherein the at least one mobile terminal apparatus is further configured to:

determine whether the number of re-transmission times for the first FD packet and the second FD packet exceeds a maximum number of re-transmission times;

terminate the packet transmission when the number of re-transmission times exceeds the maximum number of re-transmission times; and add 1 to the number of re-transmission times and send the first FD packet and the second FD packet once more when the number of re-transmission times does not exceed the maximum number of re-transmission times.

* * * * *